United States Patent [19]
Kanno

[11] Patent Number: 5,481,293
[45] Date of Patent: Jan. 2, 1996

[54] IMAGE PROCESSING DEVICE FOR CORRECTING AN ERROR IN A MULTILEVEL IMAGE SIGNAL AND FOR PRINTING THE IMAGE

[75] Inventor: Hiroki Kanno, Yokohama, Japan

[73] Assignee: Kabushiki Kaisha Toshiba, Kawasaki, Japan

[21] Appl. No.: 201,038

[22] Filed: Feb. 24, 1994

[30] Foreign Application Priority Data

Mar. 25, 1993 [JP] Japan ................................. 5-067074

[51] Int. Cl.⁶ ...................................................... H04N 1/21
[52] U.S. Cl. ........................................... 347/251; 358/298
[58] Field of Search ..................................... 358/296, 298, 358/300, 302; 346/108, 160; 347/131, 240, 251

[56] References Cited

U.S. PATENT DOCUMENTS 5,077,615  12/1991  Tsuji ......................... 358/298

OTHER PUBLICATIONS

Floyd et al., "An Adaptive Algorithm for Spatial Greyscale", Proceeding of the SID, vol. 17, pp. 75–77 (1976).

*Primary Examiner*—Mark J. Reinhart
*Attorney, Agent, or Firm*—Foley & Lardner

[57] ABSTRACT

An image processor comprises a correction unit for correcting an input image signal in accordance with a correction signal, a multilevel coding unit for converting the corrected image signal into a multilevel signal having a level corresponding to one of the gradation levels of a printer, a converter for converting the multilevel signal into a reflectance signal corresponding to the printing characteristics of the printer, and an error calculating unit for calculating a difference between the corrected image signal and the reflectance signal, the difference being applied to the correction unit as the correction signal. Although no gamma corrections are made on pixel signals, an image can be printed with its gradations reproduced fully regardless of the use of a simple conversion table.

3 Claims, 5 Drawing Sheets

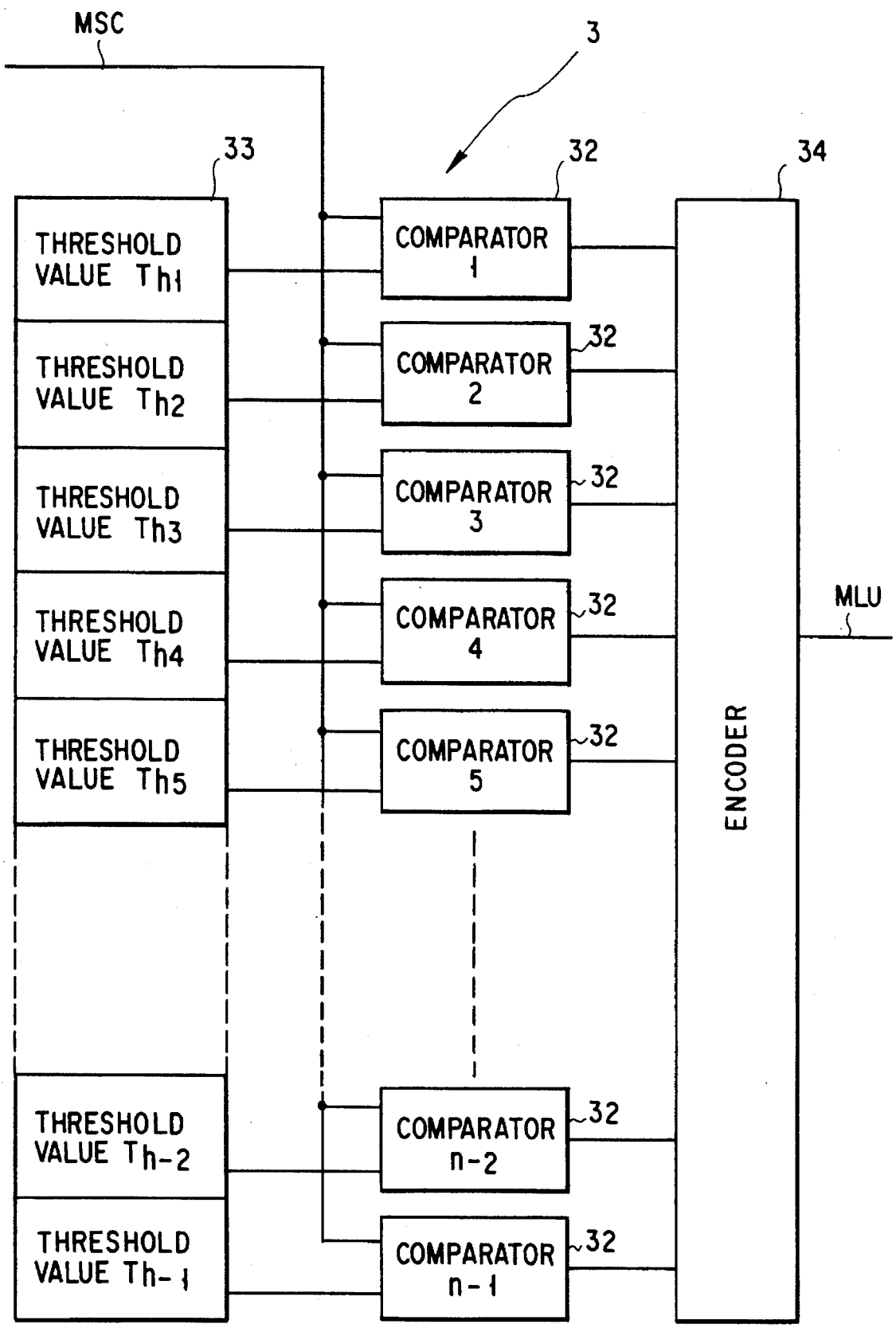
F I G. 2

IMAGE PROCESSING DEVICE FOR CORRECTING AN ERROR IN A MULTILEVEL IMAGE SIGNAL AND FOR PRINTING THE IMAGE

BACKGROUND OF THE INVENTION

1. Field of the Invention

The present invention relates to an image processing device which performs a multi-valued coding process on document images containing photographic images using an error dispersion method to reproduce the gradations of the images with high fidelity.

2. Description of the Related Art

In general, in image processing devices which handle not only character code information but also image information read from an original by a read means such as a scanner, high-contrast image information, such as characters, lines, etc., is subjected to simple binarization (binary coding) using a fixed threshold value, whereas image information such as photographs is subjected to binarization by a pseudo-gradation-reproducing means such as a dithering scheme. The reason is that, with the simple binarization process using a fixed threshold value, no image degradation occurs in character/line image areas because image resolution is preserved, whereas image degradation occurs in photographic image areas because the gradations thereof cannot be preserved. On the other hand, when a gradation reproducing means such as organizational dithering is performed on image information read from an original to reproduce gradations thereof, photographic image areas are not degraded because the gradations thereof are preserved, whereas character/line image areas are degraded because their resolution is lowered. That is to say, with a single binarization process for image information including photographs, characters and lines, it is impossible to ensure the quality of each of image portions which differ in feature at a time.

As a binary coding technique which ensures the gradations of photographic image portions and moreover provides good resolution for character/line image portions in comparison with the organizational dithering technique an error dispersion method has been proposed. For information on this method, reference is made to "An adoptive Algorithm for spatial gray scal" by R. W. Floyd and L. Steinberg, Proceeding of the SID, Vol. 17, pp 75–77, 1976. According to this error dispersion method, binary-coding errors of peripheral pixels already binary coded (or multi-valued or multilevel coded) are multiplied by weighting coefficients, the values of the products are added to the density value of a pixel of interest, and then the pixel of interest is binary coded with a fixed threshold value. Here, the binary-coding error refers to a difference between input and output signals of a binary coding circuit. In other words, the error dispersion method is the one to disperse a binary-coding error produced by binary coding a pixel of interest to peripheral pixels for error compensation, thereby minimizing binary-coding errors. In the case where an input image is a photograph, therefore, it is possible to perform a binary coding process which ensures the gradations of the photograph.

Even when the error dispersion method is used, however, it is required to make gamma corrections on printer's recording characteristics on the basis of the density by the use of a correcting means. Since, even if binary (two-valued) signals thus obtained, and high level "1" and low level "0" are output by a printer, the reflectance of each pixel recorded is not accurately 100% or 0%, thus, the conventional method cannot perform accurate error calculations. Since input signals to the system based on the error dispersion method are signals based on reflectance, error corrections, error calculations, and error filtering should be performed on the basis of reflectance signals.

SUMMARY OF THE INVENTION

It is therefore a primary object of the present invention to provide an image processing device based on an error dispersion method which eliminates the need for gamma corrections to thereby reduce the amount of hardware required, and permits all calculations from the input to the output of the device to be performed in terms of reflectance signals to thereby perform accurate error calculations for high-quality outputs.

This object and others are achieved in accordance with the present invention by an image processor which comprises: an image processing device comprising a scanner unit for scanning an image optically and providing a pixel signal, a first conversion unit connected to receive the pixel signal from the scanner unit for converting the pixel signal into a multilevel signal, a second conversion unit connected to receive the multilevel signal from the first conversion unit for converting the multilevel signal to a reflectance signal corresponding to the level of the multilevel signal and indicating the level of reflectance of light, an error calculating unit for calculating an error between the level of the reflectance signal from the second conversion unit and the level of the pixel signal from the scanner unit, and a correcting unit for correcting the pixel signal output from the scanner unit on the basis of the error calculated by the error calculating unit.

In the image processing device of the present invention using an error dispersion method, a density signal is converted into a reflectance signal by the multilevel signal conversion means, and the correcting means, the error calculating means and the error filtering means perform calculations using reflectance signals. Thus, unlike conventional devices, the image processing device of the present invention eliminates the need for gamma corrections. All the calculations which are performed from the input to the output are performed in terms of reflectance signals, permitting accurate error calculations.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 2 shows an arrangement of the multi-valued coding unit of FIG. 1;

DETAILED DESCRIPTION OF THE PREFERRED EMBODIMENT

Hereinafter, a preferred embodiment of the present invention will be described with reference to the accompanying drawings.

Figure 1:
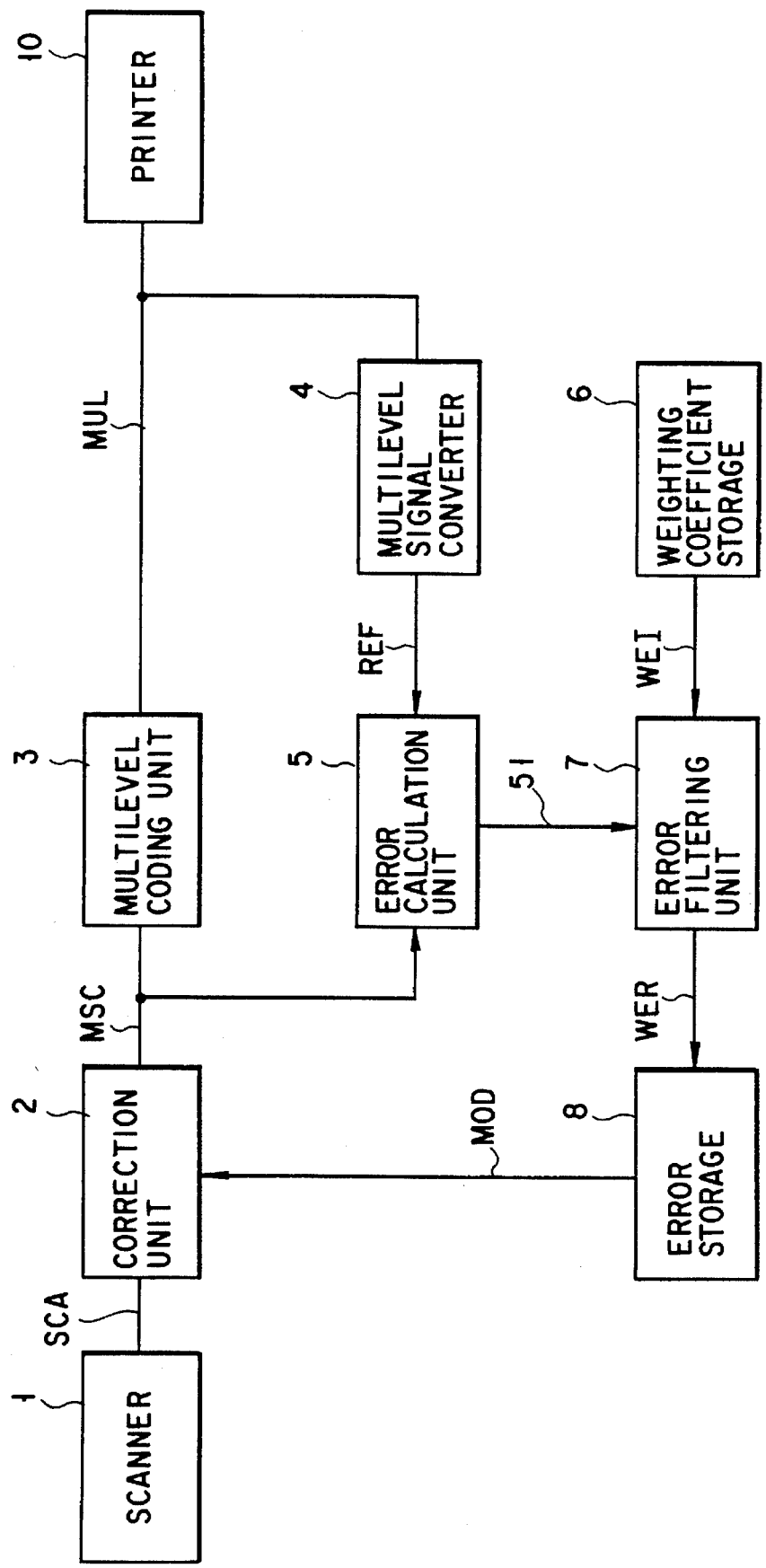
FIG. 1 is a block diagram of an image processing device according to an embodiment of the present invention.

Referring to FIG. 1, there is shown, in block diagram form, a schematic arrangement of an image processor according to an embodiment of the present invention. An input image signal SCA read from an original by an image input device such as a scanner is fed into a correction unit 2 where the input signal is corrected by a correction amount signal MOD to be described later and a corrected image signal MSC is then output. A multi-valued or multilevel coding unit 3 (in this example, the number of levels of the multilevel is supposed to be n) compares the corrected image signal MSC with multiple threshold values THl through THn-1 to output multilevel image signal MUL (0 to n-1). A multilevel signal converter 4 converts an input multilevel signal MUL into a reflectance signal REF for an output device such as a printer, which corresponds to the level of the signal MUL. An error calculation unit 5 calculates a difference between the corrected image signal MSC and the reflectance signal REF and then outputs it as a multilevel coding error signal ERR.

An error filtering unit 7 multiplies the multilevel coding error signal ERR by each of weighting coefficients A, B, C, D (which will be described later) for four pixels in the neighborhood of a pixel of interest to calculate weighted errors WER. An error storage 8, which is a memory for storing weighted errors WER, stores the weighted errors for the four pixels calculated by the error filtering unit in the corresponding respective memory locations allocated to the four peripheral pixels in the neighborhood of the pixel of interest. The four weighted errors are calculated for each of the pixels and accumulated in the error storage 8. That correction amount signal MOD is a signal in which the weighted errors for the four peripheral pixels calculated by the above procedure are accumulated.

Next, the operation of an embodiment of the image processor using a multilevel coding process of the present invention will be described in detail. The image processor of the present embodiment is arranged to receive data read by a read device such as image scanner 1 and converted into digital data of, for example, eight bits per pixel as an uncorrected image signal and then perform a multilevel coding process on it for subsequent transmission to an output device such as a printer. The present embodiment will be described hereinafter on the assumption that the number of multi-valued levels (the number of possible values of a multilevel coded signal) is n.

In FIG. 1, the correction unit 2 corrects an image signal from a pixel of interest by a correction amount signal MOD and is formed of an adder. The correction unit 2 adds an input image signal SCA and a correction amount signal MOD and then outputs a corrected image signal MSC represented by $$MSC = SCA + MOD \tag{1}$$

By adding the input image signal SCA represented by eight bits per pixel and the 9-bit correction amount signal MOD comprised of an 8-bit image signal and a sign bit, the corrected image signal MSC will have a maximum of 10 bits.

The multilevel coding unit 3 performs a multilevel coding process which compares the corrected image signal MSC with predetermined threshold values Th1 through Thn-1, thereby outputting a multilevel signal MUL. The multilevel coding circuit 3 is constructed, as shown in FIG. 2, from a threshold memory 33 storing a number (n-1) of threshold values Th1 through Thn-1, a number (n-1) of comparators 32 each of which compares a corrected image signal MSC with a respective one of the threshold values Th1 to Thn-1, and an encoder 34. For example, the multi-valued coding circuit 3 is arranged such that it outputs a 0 as a multilevel image signal MUL when the level of an corrected image signal MSC is smaller than the threshold value Th1, a 1 when MSC is equal to or greater than Th1 but smaller than Th2, a 2 when MSC is equal to or greater than Th2 but smaller than Th3, and so on. This comparison procedure is represented by

| | |
|---|---|
| MUL = 0: | MSC < Th1 |
| MUL = 1: | Th1 ≦ MSC < Th2 |
| MUL = 2: | Th2 ≦ MSC < Th3 |
| MUL = n-2: | Thn-2 ≦ MSC < Thn-1 |
| MUL = n-1: | Thn-1 ≦ MSC (2) |

Figure 3:
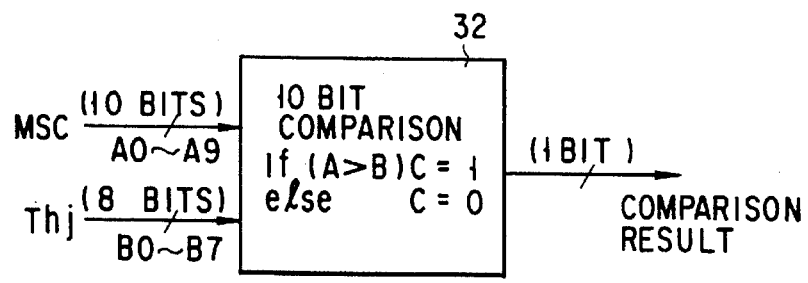
FIG. 3 shows an arrangement of the comparator in the multi-valued coding circuit of FIG. 2.
Figure 4:
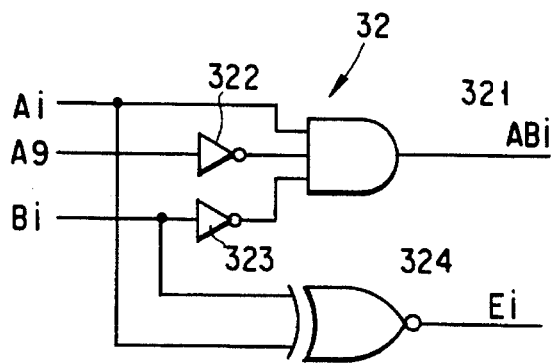
FIG. 4 shows an arrangement of the comparator in the multi-valued coding circuit of FIG. 2.
Figure 5:
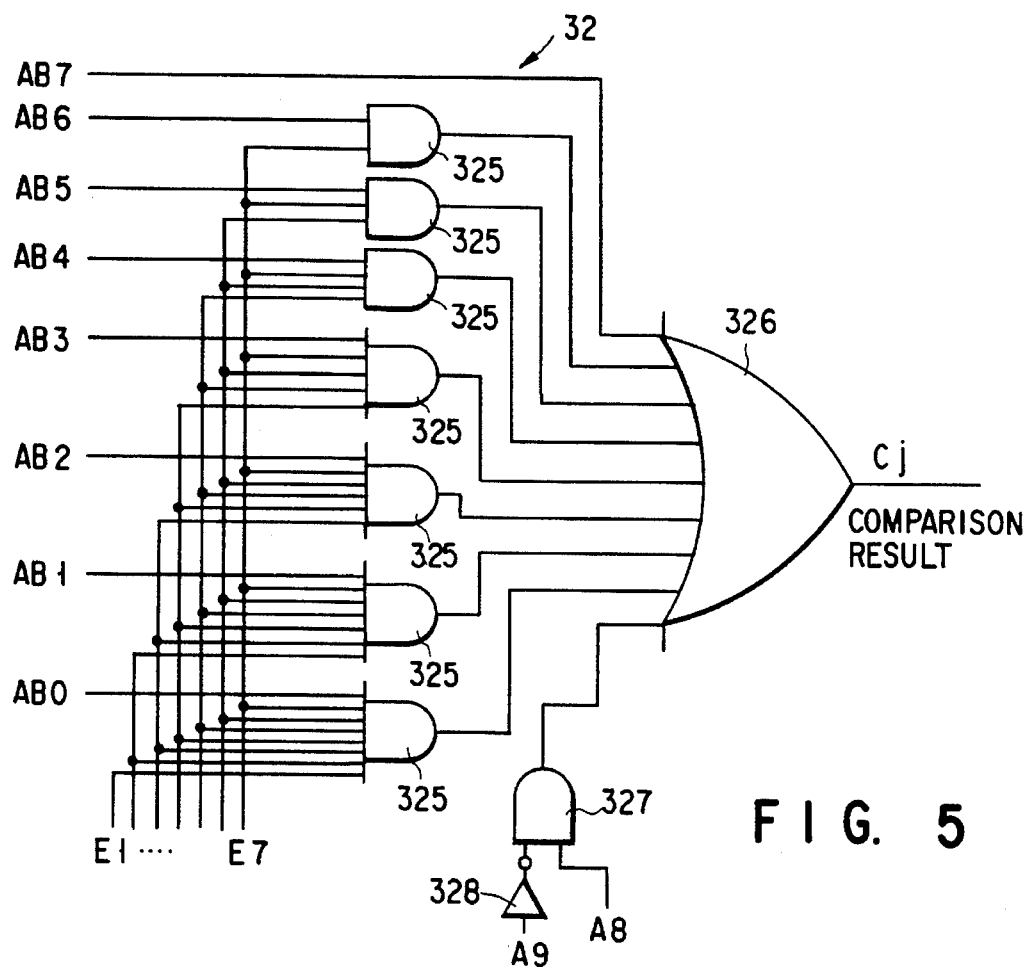
FIG. 5 shows an arrangement of the comparator in the multi-valued coding circuit of FIG. 2.

An example of each of the comparators 32 is illustrated in FIG. 3 through FIG. 5. In FIG. 3, A0 through A9 represent the respective bits of a corrected image signal SMC, and B0 through B7 represent the respective bits of a threshold value ThJ (j=1, 2, ..., n-1). In each of the comparators 32, a 10-bit corrected image signal MSC is compared with a respective one of the threshold values Th1 through Thn-1. As a result, each comparator outputs the result of comparison consisting of one bit. FIG. 4 shows an input circuit of each comparator, which is constructed from an AND circuit 321, inverter circuits 322 and 323, and an Exclusive NOR circuit 324. To the input circuit are applied bit Ai of the corrected image signal MSC and bit Bi (i=0, 1, 7) of the corresponding threshold value Thj. FIG. 5 shows the output circuit of each comparator, which is constructed from AND circuits 325 and 327, an OR circuit 326, and an inverter 328. The OR circuit 326 provides a comparator output Cj. The encoder 34 of FIG. 2 codes the outputs Cj of the n-1 comparators 32 and then outputs the result of this coding process as a multilevel image signal MUL.

Figures 6, 7A, 7B:
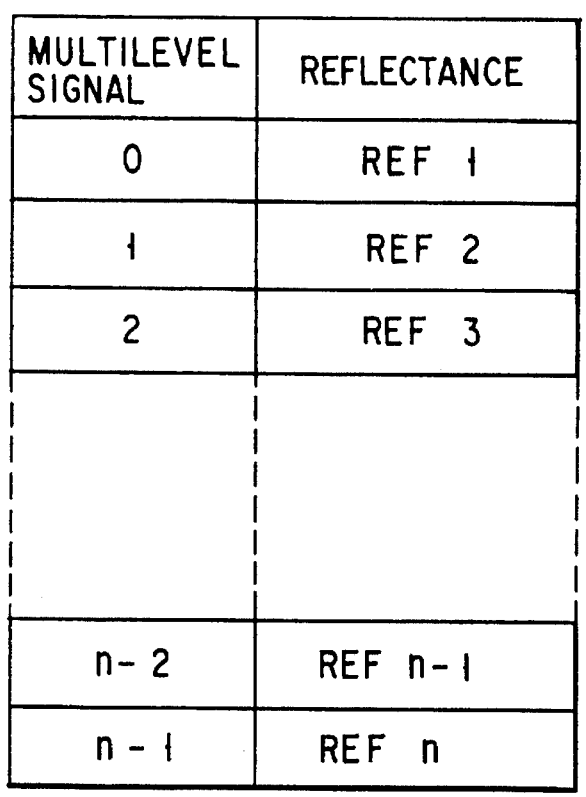
FIG. 6 shows an arrangement of the multi-valued signal converter of FIG. 2.
FIG. 7A shows the weighting coefficient storage of FIG. 2.
FIG. 7B shows the error filtering unit of FIG. 2 illustrating a positional relation of a pixel of interest indicated by * with four peripheral pixels with weighting errors.

Next, the multilevel signal converter 4 calculates a reflectance signal REF from the multilevel signal MUL. The multilevel signal converter 4 is constructed from such a conversion table as shown in FIG. 6. In this conversion table, there have been stored previously respective reflectance signals for each of the possible levels (0 to n-1) of a multilevel image signal MUL. If, therefore, the output device such as printer 10 has n density levels, then a single table that contains n reflectance signals (each consisting of eight bits) respectively corresponding to the n density levels of the printer will be needed. The multilevel signal converter 4 permits the recording characteristics, such as gamma characteristics, of the output device 10 to be compensated for, thus eliminating the prior need for each of various types of printers to perform a separated gamma correction process. In other words, whereas the conventional gamma correction process needs a 256-byte conversion table in order to convert an 8-bit input image signal to an 8-bit corrected image signal, the multilevel signal converter 4 of the invention has only to comprise a conversion table of n bytes at the most. Thus, a reduction in the amount of hardware (memory) required can be effected.

Referring now back to FIG. 1, the error calculation unit 5 calculates a difference between a corrected image signal MSC and a reflectance signal REF to thereby obtain a multilevel coding error produced by the multilevel coding unit 3. The error calculation unit 5 is constructed from a subtracter and performs the process of subtraction of the corrected image signal MSC output from the correction unit 2 and the multilevel image signal MUL to calculate a multilevel coding error signal ERR by the equation $$ERR = MSC - REF \qquad (3)$$

The error filtering unit 7, which is constructed from multipliers and adders, multiplies the multilevel coding error ERR and weighting coefficients WEI stored in the weighting coefficient storage 6 to output weighted errors WER. An arrangement of the weighting coefficient storage 6 is shown in FIG. 7A. The weighting coefficient storage comprises a memory which stores four weighting coefficients (for example, A=7/16, B=1/16, C=5/16, D=3/16) in memory locations corresponding to the positions of the four peripheral pixels in the neighborhood of an pixel of interest indicated by *. The positional relationships of the pixel of interest * with the weighted errors of the four peripheral pixels are illustrated in FIG. 7B. Suppose here that the multilevel coding error ERR is represented by e. Then, the weighted error of each of the peripheral pixels is defined as follows:

$$e_A = A \times e \qquad (4)$$

$$e_B = B \times e \qquad (5)$$

$$e_C = C \times e \qquad (6)$$

$$e_D = D \times e \qquad (7)$$

As to $e_B$, however, it may be defined as $$e_B = e - (e_A + e_C + e_D) \qquad (8)$$

The weighted errors ($e_A$, $e_B$, $e_C$, $e_D$) are each stored in the corresponding locations in the error storage 8 which is formed of a two-line memory. In the error storage 8 there have been already stored weighted errors of the peripheral pixels associated with the pixel of interest which was inputted previously. Thus, each of the above weighted errors ($e_A$, $e_B$, $e_C$, $e_D$) is stored added to the previous weighted error in a corresponding memory location in the error storage 8.

Figure 8:
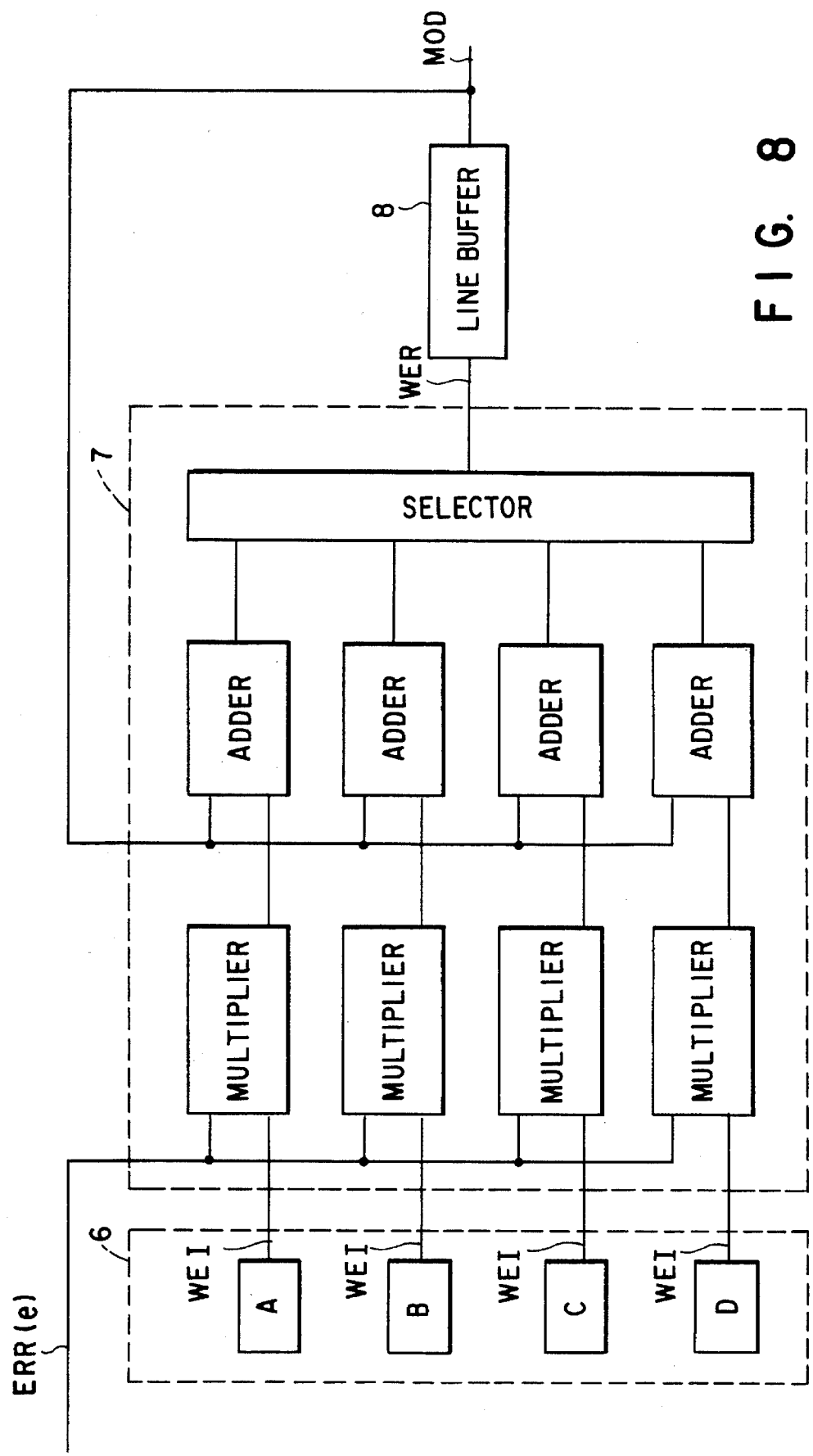
FIG. 8 shows arrangements of the weighting coefficient storage of FIG. 7A, the error filtering unit of FIG. 7B, and the error storage of FIG. 2.

FIG. 8 illustrates, in block diagram form, the weighting coefficient storage 6, the error filtering unit 7, and the error storage 8. The correction amount signal MOD is a signal read from the location of * shown in FIG. 7B in the error storage 8. In the location indicated by * there have been stored the sum of weighted errors for four pixels which have been processed already. In this manner the correction amount signal MOD used in the correction unit 2 is calculated.

According to the present invention, as described above, the following advantages are achieved: The multilevel signal converter 4 has only to be provided with a table of n bytes (n indicates the number of gradation levels possible with the printer 10) at the most, while the conventional gamma correction procedure needs a 256-byte table for converting an 8-bit input signal to an 8-bit corrected signal. Consequently, the amount of hardware (memory) required can be decreased. In addition, the provision of the multilevel signal converter 4 enables all error calculations from the input to the output to be performed in terms of reflectance signals, which permits accurate error calculations to be performed and multilevel coding with good gradation characteristics to be practiced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing device for correcting a multilevel error in an image signal having a plurality of pixel signals, and printing an image, said image processing device comprising:

reading means for reading said plurality of pixel signals, and outputting a $2^m$ bit pixel signal (where m is an integer);

correcting means for receiving the $2^m$ bit pixel signal output from said reading means and a correction signal, and correcting the pixel signals on the basis of the correction signal;

multilevel image signal producing means for comparing a value of the pixel signals corrected by said correcting means with an N–1 number of threshold values, and producing a multilevel image signal having N levels (where N≠$2^m$);

printing means for printing the image on the basis of the multilevel image signals having N levels produced by said multilevel image signal producing means;

converting means, having a reflectance table for storing compensated reflectance corresponding to each of the multilevel image signals to compensate a γ characteristic of said printing means, and converting the multilevel image signal into a compensated reflectance signal on the basis of said reflectance table;

error calculating means for calculating a difference between a value of the corrected pixel signals provided from said correcting means and a value of the compensated reflectance signal provided from said converting means;

weight coefficient storing means for storing weight coefficients corresponding to peripheral pixels located around a pixel represented by the pixel signals corrected by said correcting means;

filter means for calculating weighted errors with respect to the peripheral pixels by multiplying each of the weight coefficients stored in said weight coefficient storing means with the difference calculated by said error calculating means; and error storing means for storing the weighted errors calculated by said filter means with respect to the individual peripheral pixels such that each weighted error is accumulated on a weighted error of a previously calculated pixel, and outputting the accumulated error as said correction signal to said correcting means.

2. An image processing device for correcting a multilevel error of an image signal having a plurality of pixel signals, and printing an image, said image processing device comprising:

reading means for reading said plurality of pixel signals, and outputting a $2^m$ bit pixel signal (where m is an integer);

correcting means for receiving the $2^m$ bit pixel signal output from said reading means and a correction signal, and correcting the pixel signals on the basis of the correction signal;

multilevel image signal producing means for comparing values of the pixel signals corrected by said correcting means with an N−1 number of threshold values, and producing a multilevel image signal having N levels ($N \neq 2^m$);

printing means for printing the image on the basis of the multilevel image signal having N levels produced by said multilevel image signal producing means;

converting means, having a reflectance table for storing compensated reflectance corresponding to each of the multilevel image signals for compensating a γ characteristic of said printing means, and converting the multilevel image signal into a compensated reflectance signal on the basis of said reflectance table; and error calculating means for calculating a difference between a value of the corrected pixel signals provided from said correcting means and a value of the compensated reflectance signal provided from said converting means, and supplying the difference as said correction signal to said correcting means.

3. An image processing device for correcting a multilevel error of an image signal having a plurality of pixel signals, and displaying the image, said image processing device comprising:

reading means for reading said plurality of pixel signals, and outputting a $2^m$ bit pixel signal (where m is an integer);

correcting means for receiving the $2^m$ bit pixel signals output from said reading means and a correction signal, and correcting the pixel signals on the basis of the correction signal;

multilevel image signal producing means for comparing a value of the pixel signals corrected by said correcting means with an N−1 number of threshold values, and producing a multilevel image signal having N levels ($N \neq 2^m$);

visible displaying means for visibly displaying the image of the multilevel signals produced by said multilevel image signal producing means;

converting means, having a reflectance table for storing compensated reflectance corresponding to each of the multilevel image signals and compensating a γ characteristic of said visible displaying means, and converting the multilevel image signal into a compensated reflectance signal on the basis of said reflectance table; and error calculating means for calculating a difference between a value of the corrected pixel signal provided from said correcting means and a value of the compensated reflectance signal provided from said converting means, and outputting the difference as the correction signal to said correction means.

* * * * *